Sept. 29, 1925.

W. B. FREEMAN 1,555,196

TIRE BUILDING APPARATUS

Filed June 19, 1922

Inventor
Walter B. Freeman
By Robert M. Pierson
Atty.

Patented Sept. 29, 1925.

1,555,196

UNITED STATES PATENT OFFICE.

WALTER B. FREEMAN, OF CUYAHOGA FALLS, OHIO, ASSIGNOR TO THE B. F. GOODRICH COMPANY, OF NEW YORK, N. Y., A CORPORATION OF NEW YORK.

TIRE-BUILDING APPARATUS.

Application filed June 19, 1922. Serial No. 569,298.

*To all whom it may concern:*

Be it known that I, WALTER B. FREEMAN, a citizen of the United States, residing at Cuyahoga Falls, in the county of Summit and State of Ohio, have invented a certain new and useful Tire-Building Apparatus, of which the following is a specification.

This invention relates to apparatus for building vehicle tires and more particularly to apparatus for pendulously supporting and driving an annular tire-base by roller means contacting the inner periphery of the base. In the building of certain types of hollow or cushion tires, the tire base consists of circumferential side members, which may be connected at intervals by spacing means or bridges. A sectional core structure is associated with the base, the tire-body or cushion is formed by winding strips of tire-building material upon the base and core-structure, and the core sections are subsequently withdrawn from the base to leave a cavity or cavities within the tire-body. As the means for clamping the core-sections in assembled relation with the base project from the inner periphery of the latter, apparatus heretofore used for tire-bases for solid tires, the inner peripheries of which tire-bases are not obstructed by such clamping means, is not adapted to support and drive tire-bases for cushion tires where such clamping means are used.

My chief object is to provide improved apparatus adapted pendulously to support and drive a tire-base whose inner periphery is obstructed by such clamping means. A further object is to provide apparatus readily adaptable for different sized tire-bases of the type referred to. Another object is to provide apparatus adapted to lessen the effort required of the operator in mounting and removing the work.

Figure 1:
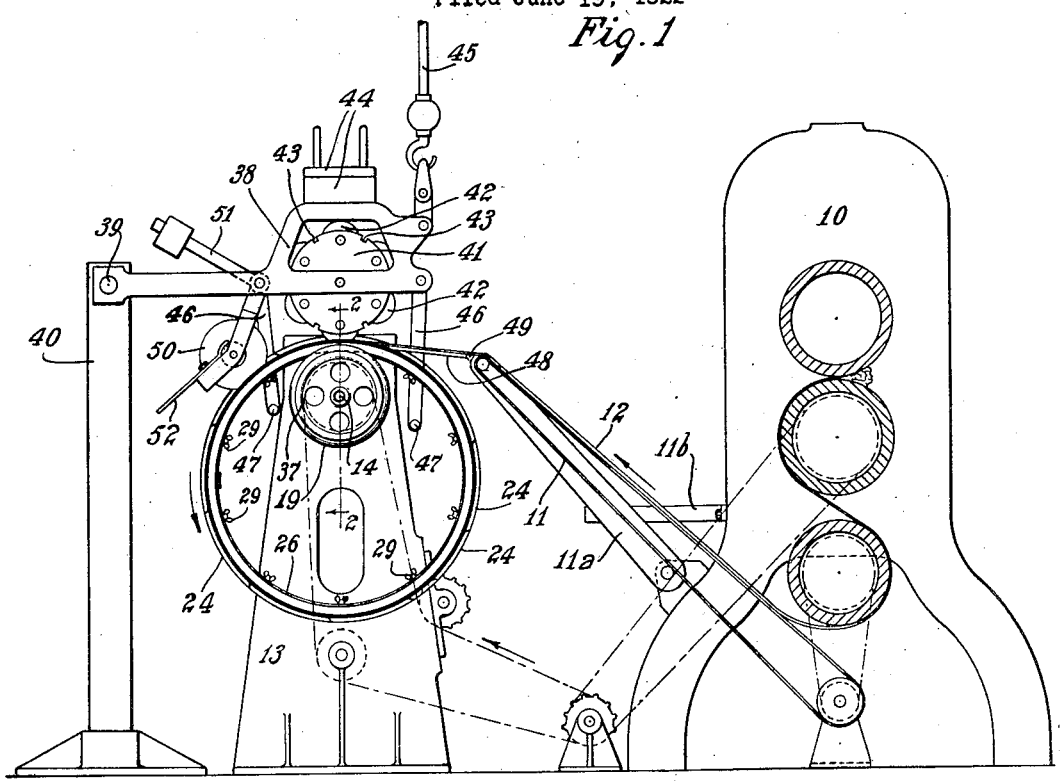
Fig. 1 is an elevation of a calender and a work-supporting, driving and pressing mechanism embodying my invention.

Referring to the drawings, 10 is a calender of a common type equipped with the usual slitting knives (not shown) and with an endless belt carrier 11, mounted upon a pivoted arm 11ª held in position by a brace 11ᵇ, said calender being thus adapted to supply strips of tire-building material, one of which strips is shown at 12, said strips being delivered by said carrier to a point adjacent the base-supporting and driving mechanism.

The latter comprises a hollow standard 13 in the top of which is journaled a horizontal shaft 14 having secured thereon within the standard a sprocket 15 by which said shaft is adapted to be driven, counter-clockwise as viewed in Fig. 1, by suitable driving connections such as those indicated in Fig. 1, from the calender 10.

Figure 2:
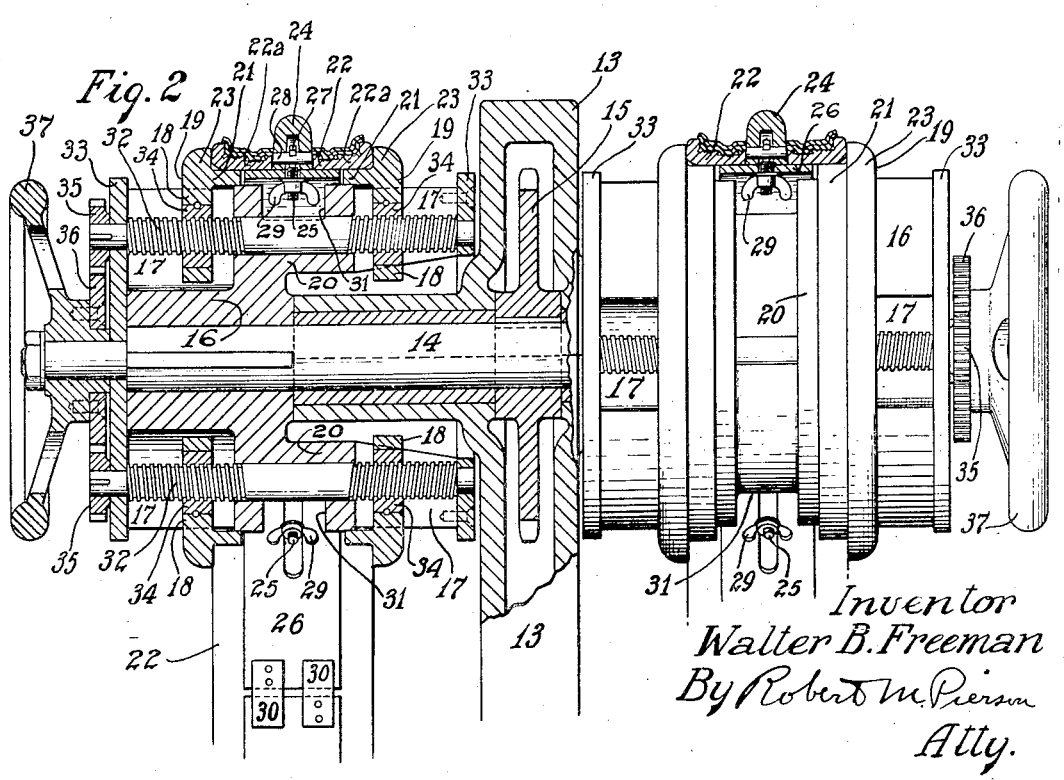
Fig. 2 is a section on line 2—2 of Fig. 1.

The end portions of the shaft 14 project or overhang at the respective sides of the standard and secured upon each of said projecting end portions is a generally cylindrical hub-member or drum 16 recessed from its outer periphery at diametrically opposite points, as indicated at 17, 17, (Fig. 2), to accommodate inwardly extending ears 18, 18 formed upon a pair of work-supporting and guiding rings 19, 19, slidably mounted upon the drum 16. The recesses 17 preferably extend, from the respective ends of the drum, only part way toward the middle cross-sectional plane of the drum, leaving a web 20 between said recesses, the outer surface of which web constitutes a part of the cylindrical surface of the drum. I do not wholly limit my claims, however, to the presence of said web.

The rings 19 are formed with annular, cylindrical flange portions 21, 21, slidably fitting the drum 16 and adapted to underlie the side margins of the tire-base, 22, to support the latter, and with radial guide-flanges 23, 23 adapted to abut respective sides of the tire-base to center and guide the same. The tire-base here shown is of a type having two circumferential side members 22ª, 22ª, which may be connected at intervals by integral or other spacing means or bridges (not shown), and 24, 24 are core sections mounted between said side members and each secured in assembled relation therewith by a bolt 25 extending from said core-section through a slot in a clamping ring 26, said clamping ring fitting within the tire-base, and said bolt being formed with a hooked end 27 engaging a cross-pin 28 traversing a recess in the core section, and the other end of said bolt having threaded thereon a clamping nut 29. As here shown the ring 26 is transversely split and when of this type the ring should be resilient and normally of such size as to press outwardly against the tire-base when mounted therein. 30, 30 are bridge plates secured to respective ends of the split ring and extending across the split, to prevent relative radial displacement of said ends although permitting the ring to be contracted for insertion within the tire-base.

The cylindrical flange-portions 21 of the base-supporting and guiding rings 19 are of such thickness as to provide a space between the drum 16 and the tire-base 22 to accommodate the clamping ring 26, and said drum, including the webs 20, is encircled at its middle by an annular recess 31 adapted to accommodate the clamping bolts 25 and the nuts 29 thereon.

For sliding the work-supporting and guiding rings 19 upon the hub member or drum 16, to close them upon the tire-base or to position them for tire-bases of different widths, a pair of right-and-left-threaded screws 32, 32 are mounted upon each of the drums 16. Said screws are journaled in the webs 20, traversing the recesses 17, and their ends are rotatably mounted in and held against axial movement by end plates 33, 33 secured to said drums. Threaded bushings 34, 34 are mounted upon said screws and secured in the respective ears 18 of the work-supporting and guiding rings 19. The outer ends of the screws 32 project through their bearings in the outer end plate 33 and have secured thereon respective gears 35, 35 meshed with a gear 36 secured upon the hub of a hand-wheel 37, the latter being rotatably mounted upon the reduced end portion of the shaft 14.

For pressing the strip of tire-building material 12 onto each of the tire-bases in successive convolutions, a tool-carrying arm 38 (Fig. 1), is pivoted at 39 on a standard 40, the outer end of said arm being formed with a housing in which is journaled a turret 41. 42, 42 are presser rollers journaled on said turret and adapted to press the plastic strip 12 onto the tire-base and to be brought selectively into operative position by turning said turret to different angular positions. Certain of said rollers may be so formed as to press a strip of hard rubber composition into the grooves of the tire-base on opposite sides of the core sections 24, while others are adapted for later stages of the operation. The turret is formed with notches 43 on its periphery which may be engaged by any suitable latching means (not shown) upon the arm 38, to hold said turret with one or another of the presser rollers 42 in operative position. 44 is a set of weights mounted upon the arm 38 to press it toward the work, and 45 is a part of a power lift for raising the arm 38 and parts carried thereby clear of the work for the removal or insertion of the latter, and for lifting the work from its support or lowering it thereonto, as will presently be described. 46, 46 are depending arms pivoted on the arm 38 and provided at their lower ends with horizontally projecting studs 47 adapted to engage the inner periphery of the work to lift it from or lower it onto the rings 19 when the arm 38 is raised or lowered. 48 is a bridge-plate pivoted at 49 on the end of the supporting arm 11ª of the endless carrier 11, said bridge-plate being adapted to ride upon the work and support and guide the strips 12 from said carrier onto the tire-base. Similar strip-guiding and pressing mechanism may be provided for each of the tire-bases supported by the standard 13.

For pressing the tire-building material 12 immediately at the sides of the core-sections 24, so as to compact it about the crown of the latter, a pair of narrow presser rollers, one being shown at 50, may be journaled on a weighted bell-crank lever 51 pivoted on the arm 38, said rollers being urged toward each other upon their axle or axles, against said core sections by suitable springs (not shown). 52 is one of a pair of hand-levers adapted to spread said presser rollers 50 apart to permit them to be brought into operative position, straddling the core.

In the operation of the apparatus, the hub-members 16 are driven from the calender 10 at a fixed relative speed. The tool-carrying arm 38 being raised and the strip-supporting bridge 48 being turned on its pivot 49 away from the standard 13, the turret 41 is turned to bring an appropriately formed roller 42 into operative position, and latched against rotation. A tire-base, having the ring 26 and core-sections 24 assembled therewith, and which we may assume has already had a foundation layer of hard-rubber composition pressed thereon by an operation such as is now being described, is then hung upon the studs 47 of the depending arms 46, and the tire-carrying arm 38 is lowered until the tire-base 22 rests upon the cylindrical flanges 21 of the rings 19, between the guide flanges 23 of the latter, and until the selected roller 42 bears upon said tire-base. The tire-base is then rotated by the rings 19 upon which it is supported, the rollers 50 are spread apart by means of the hand levers 52, so that they will straddle the core-sections 24 and, being yieldingly urged toward each other, will press the tire-building material adjacent said core sections, as the tire-body is subsequently built up over the crown of the core.

The bridge 48 is then turned over onto the tire-base and strips of tire-building material 12 are led from the calender, over the carrier 11 and bridge 48, and started on the tire-base, one on each side of the core. The rotating base thereafter draws said strips onto itself in successive convolutions, which are compacted against the base and core by the rollers 42 and 50. When the tire-body has thus been built up to the crown of the core, the operation is continued with a single strip of material applied directly over the core, to form the tread portion of the tire.

When the tire is thus completed, the arm 38 is raised, lifting the presser rollers from the work and lifting the latter from its support and stopping its rotation. The strip is then severed and the tire-base and connected elements are slid from the studs 47, another base is hung thereon, and the operation is repeated.

The apparatus thus is adapted to support the tire-base pendulously and rotate it notwithstanding the presence of the core-clamping ring 26 and bolts 25 on its inner periphery. The rings 19 may be adjusted from and toward each other by turning the hand-wheel 37, and for the wider sizes of tire-bases the rings 19 may be substituted by similar rings in which the flanges 21 are wider, so as to extend nearly to the clamping ring 26 and thus underlie greater areas at the margins of the tire base, to avoid deformation of the latter and provide sufficient driving contact.

The apparatus is susceptible of modification within the scope of my invention and I do not wholly limit my claims to the exact embodiment here shown.

I claim:

1. Apparatus for building cushion tires, said apparatus comprising a set of core-sections adapted to be assembled with a tire-base to form a cavity or cavities in the tire-body, a core-clamping ring adapted to fit within the tire-base to support said core sections in assembled relation therewith, so that said core-sections, tire-base and core-clamping ring constitute a rigid structure, roller means adapted pendulously to support and drive said structure by engagement with its inner periphery, and guiding means for said tire-base associated with said roller means, said guiding means including a ring concentric with the latter and adapted to abut a side of the tire-base, and means for adjusting said ring in an axial direction to adapt it for tire-bases of different widths, the last said means comprising a circumferentially spaced set of screws adapted to slide said ring axially, and means for equally and simultaneously driving said screws.

2. Apparatus for building tires, said apparatus comprising an overhanging shaft, means for driving the same, a generally cylindrical drum secured on the overhanging portion of said shaft, said drum being formed with an annular recess on its outer face, a pair of work-guiding rings slidably mounted on said drum, one on either side of said recess, and means for equally and simultaneously adjusting said rings from and toward said recess.

3. Apparatus for building cushion tires on a tire-base having core-clamping attachments, said apparatus comprising a rotary, cylindrical drum having an annular recess in its outer face, a pair of work-supporting rings slidably mounted on said drum, one on either side of said recess, whereby the space between said rings is in effect a continuation of said recess, and means for adjusting said rings from and toward said recess whereby the effective outer width of the recess may be varied to clear core-clamping attachments of different sizes.

4. Apparatus for building tires, said apparatus comprising a drum adapted to receive an annular tire-base suspended thereon, means for driving said drum, a pair of work-positioning rings slidably and non-rotatably mounted on said drum, each of said rings being formed with a substantially cylindrical flange adapted to underlie said tire-base to support and drive the same as said drum is driven, and with a substantially radial flange adapted to abut a side of said tire-base to position it, and means for adjusting said rings from and toward each other.

5. Apparatus for building tires, said apparatus comprising a drum adapted to receive an annular tire-base suspended thereon, means for driving said drum, a pair of work-positioning rings slidably and non-rotatably mounted on said drum, each of said rings being formed with a substantially cylindrical flange adapted to underlie said tire-base to support and drive the same as said drum is driven, and with a substantially radial flange adapted to abut a side of said tire-base to position it, and means including a right-and-left-threaded screw for adjusting said rings from and toward each other.

6. In apparatus for building tires, the combination of roller means for pendulously supporting and driving an annular tire-support, a tool-carrying member adapted to present a tool to the outer periphery of a tire-support mounted on said roller means, directly over the latter, means for raising and lowering said tool-carrying member, and means depending from the latter adapted to engage said tire-support to lift it from said roller means when said tool-carrying member is raised.

7. In apparatus for building tires, the combination of roller means for pendulously supporting and driving an annular tire-support, means for pressing a strip of tire-building material onto said support as it is drawn thereon by the rotation of said support, an endless carrier structure adapted to deliver a strip of tire-building material to a point adjacent said roller means, and a bridge-member having one end pivoted on a stationary part adjacent said endless carrier structure, and its other end adapted to ride upon the work, for supporting said strip as it is drawn from said endless carrier structure onto the work.

In witness whereof I have hereunto set my hand this 15 day of June, 1922.

WALTER B. FREEMAN.